(12) United States Patent
Bedner

(10) Patent No.: US 6,786,241 B2
(45) Date of Patent: Sep. 7, 2004

(54) INSULATED JACKETS FOR HOT AND COLD PIPING SYSTEMS AND METHODS OF USE

(75) Inventor: Richard J. Bedner, Warren, NJ (US)

(73) Assignee: Horizon Resources Corporation, Sparks, MD (US)

( * ) Notice: Subject to any disclaimer, the term of this patent is extended or adjusted under 35 U.S.C. 154(b) by 0 days.

(21) Appl. No.: 10/600,122

(22) Filed: Jun. 20, 2003

(65) Prior Publication Data

US 2004/0074555 A1 Apr. 22, 2004

Related U.S. Application Data

(60) Provisional application No. 60/390,453, filed on Jun. 21, 2002.

(51) Int. Cl.[7] .................................................. F16L 9/14
(52) U.S. Cl. ..................... 138/148; 138/121; 138/170
(58) Field of Search .............................. 138/148, 121, 138/152, 170

(56) References Cited

U.S. PATENT DOCUMENTS

| | | | | |
|---|---|---|---|---|
| 563,775 A | * | 7/1896 | Lantzke | 428/178 |
| 2,179,057 A | * | 11/1939 | Schuetz | 138/111 |
| 3,904,379 A | * | 9/1975 | Oser et al. | 428/591 |
| 3,981,689 A | * | 9/1976 | Trelease | 52/244 |
| 6,000,420 A | * | 12/1999 | Nicholson et al. | 137/15.01 |
| 6,230,750 B1 | * | 5/2001 | Lessard et al. | 138/149 |
| 6,527,013 B2 | * | 3/2003 | Somerville et al. | 138/148 |

* cited by examiner

Primary Examiner—James Hook
(74) Attorney, Agent, or Firm—Albert W. Davis Jr.

(57) ABSTRACT

The disclosure relates to a plastic jacket having air spaces formed by a core and a cover used to insulate hot and cold piping systems and the fittings for those systems. The jacket is made by providing a core that has portions that extends away from the element and a cover surrounding the core. The insulation value of the jacket is created by the air spaces created by the jacket. The plastic of the cover alone or the cover and core can be transparent or translucent so that the condition of the piping element and the jacketed space can be checked without removing the jacket.

5 Claims, 13 Drawing Sheets

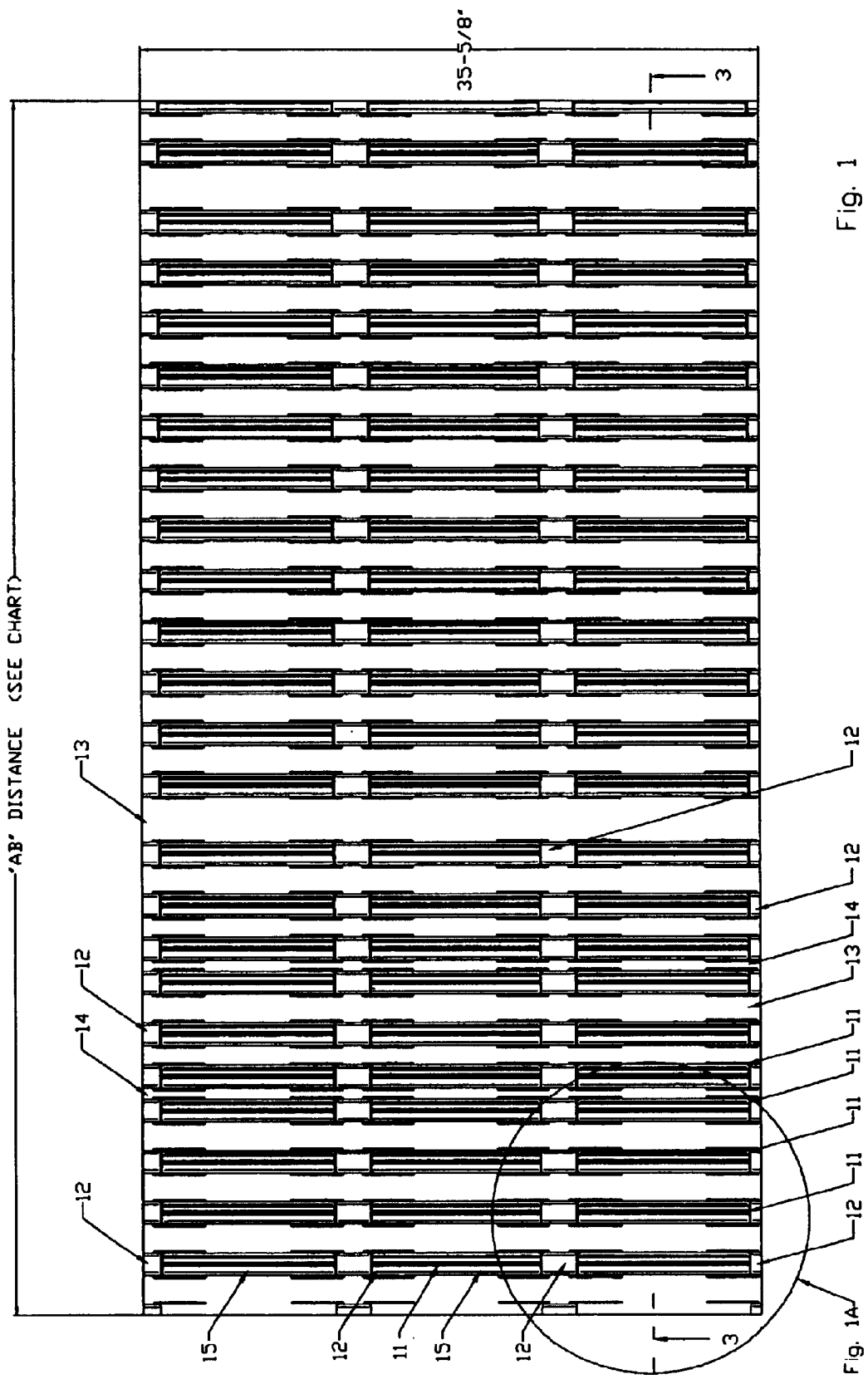

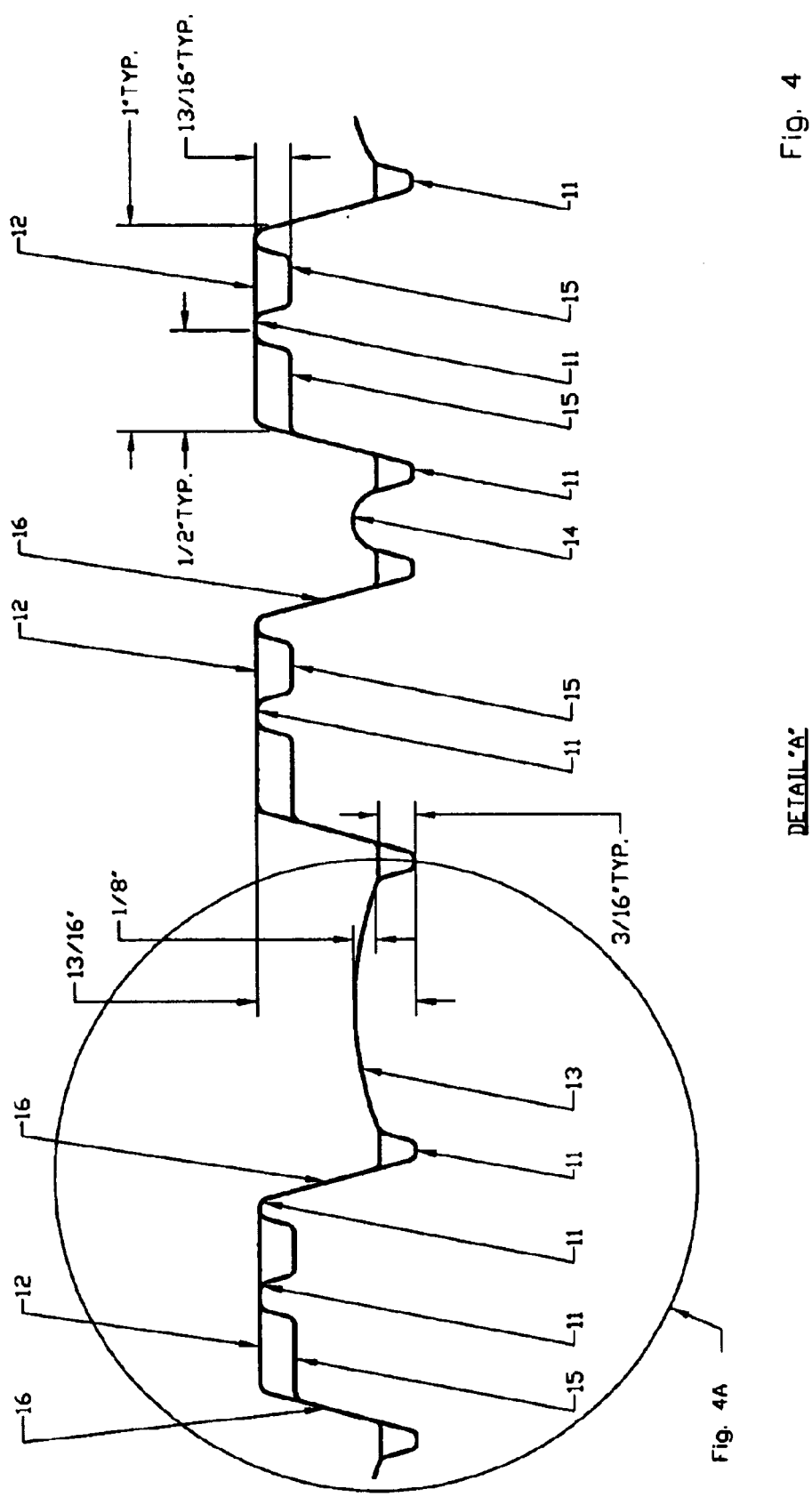

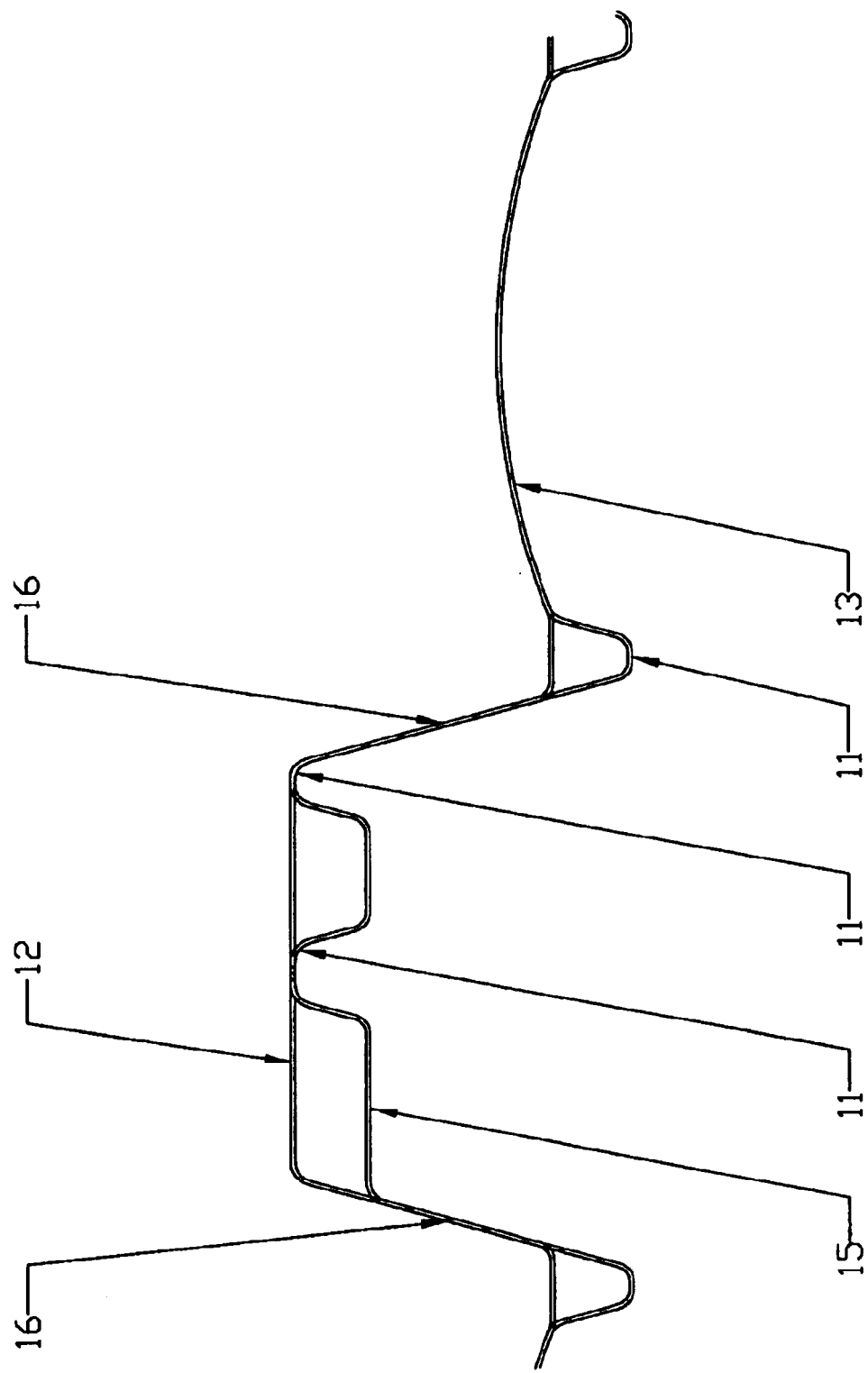

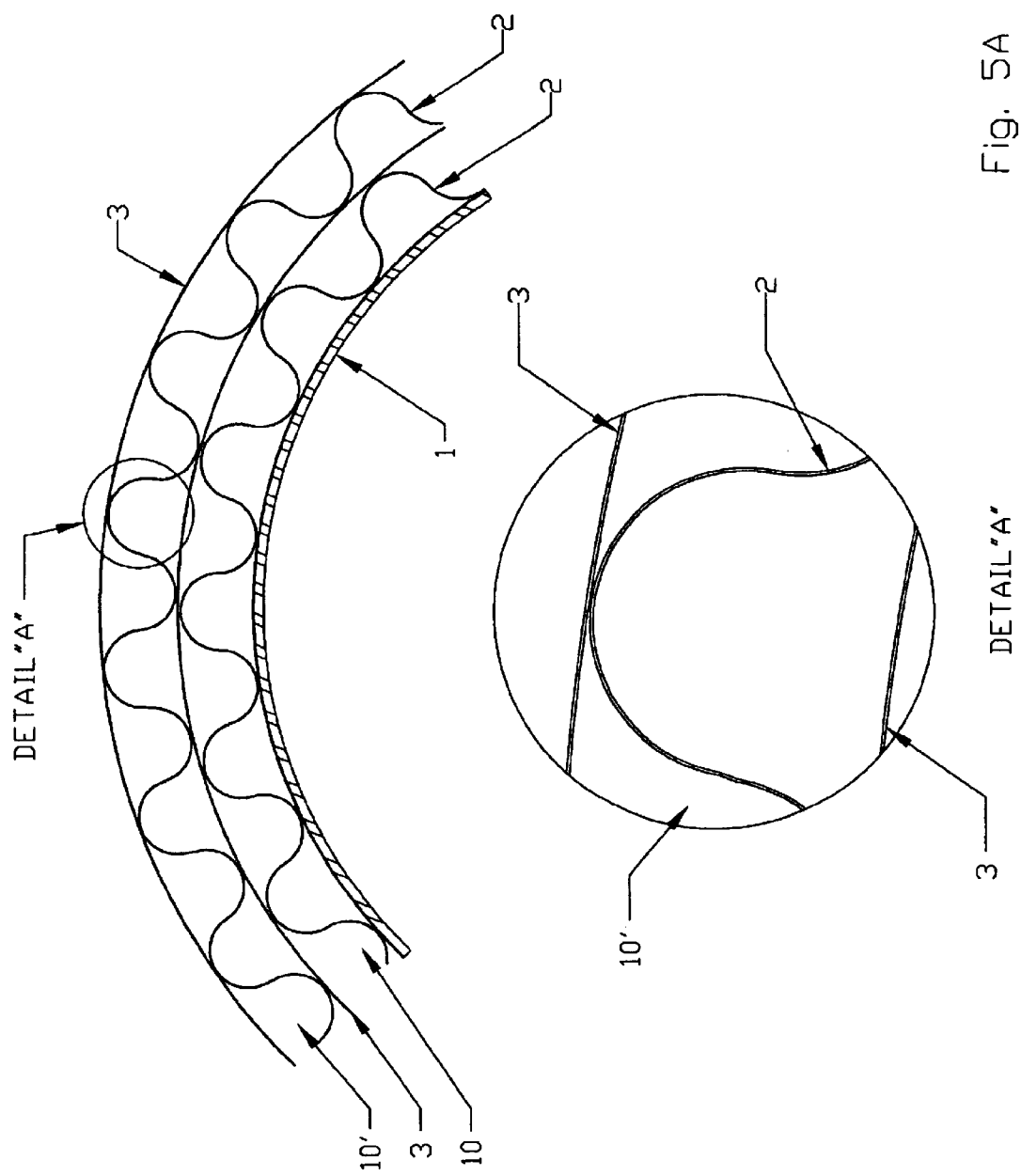

6"IPS FLANGE COVER COMPRESSED ON 3"IPS FLANGE TO SHOW SEGMENTS

| Pipe [inch] | Pipe OD [inch] | Insulair™ | | | | | A to B [inch] | Actual OD [inch] | A [inch] |
|---|---|---|---|---|---|---|---|---|---|
| | | OD Min [inch] | OD Target [inch] | Target Circumference [inch] | | | | | |
| | | | | Target | Actual | | | | |
| 2 | 2 3/8 | 4 1/8 | 4 1/4 | 13 3/8 | 13.35 | | 14 | 4 1/2 | |
| 2 1/2 | 2 7/8 | 4 5/8 | 4 3/4 | 15 | 14.92 | | 15 1/2 | 5 | 1 1/2 |
| 3 | 3 1/2 | 5 | 5 1/16 | 16 | 15.92 | | 16 1/2 | 5 1/4 | 1 |
| 4 | 4 1/2 | 6 | 6 1/16 | 19 | 19.04 | | 19 1/2 | 6 1/5 | 3 |
| 5 | 5 9/16 | 7 1/4 | 7 1/2 | 23 1/2 | 23.56 | | 24 | 7 2/3 | 4 1/2 |
| 6 | 6 5/8 | 8 1/4 | 8 3/8 | 26 1/2 | 26.31 | | 27 | 8 3/5 | 3 |
| 8 | 8 5/8 | 10 3/8 | 10 5/8 | 33 1/2 | 33.38 | | 34 | 10 5/6 | 7 (4&3) |
| 10 | 10 3/4 | 12 1/2 | 12 5/8 | 39 1/2 | 39.66 | | 40 | 12 3/4 | 6 (3&3) |
| 12 | 12 3/4 | 14 1/2 | 15 1/4 | 48 1/2 | 47.91 | | 49 | 15 3/5 | 9 (3&3&3) |
| 14 | 14 | 15 3/4 | 16 1/4 | 51 1/2 | 51.05 | | 52 | 16 5/9 | 3 |
| 16 | 16 | 14 3/4 | 18 1/4 | 57 1/2 | 57.33 | | 58 | 18 1/2 | 6 (3&3) |
| 18 | 18 | 19 3/4 | 20 1/4 | 63 1/2 | 63.62 | | 64 | 20 3/8 | 6 (3&3) |
| 20 | 20 | 21 3/4 | 22 1/4 | 70 1/2 | 69.90 | | 71 | 22 3/5 | 7 (4&3) |
| 24 | 24 | 25 3/4 | 26 1/4 | 82 1/2 | 82.47 | | 83 | 26 3/7 | 12 (3&3&3&3) |
| 30 | 30 | 31 3/4 | 32 1/4 | 101 | 101.32 | | 101 | 32 1/7 | 18 (3&3&3&3&3&3) |
| 36 | 36 | 37 3/4 | 38 1/4 | 120 1/2 | 120.17 | | 122 | 38 5/6 | 21 (3&3&3&3&3&3&3) |

Fig. 7

INSULATED JACKETS FOR HOT AND COLD PIPING SYSTEMS AND METHODS OF USE

This application is a continuation-in-part of Provisional Application S. No. 60/390,453, filed Jun. 21, 2002 entitled INSULATED JACKETS FOR HOT AND COLD PIPING SYSTEMS AND METHODS OF USE.

BACKGROUND OF THE INVENTION

The air gap technology, as described in U.S. Pat. Nos. 5,797,415 and 6,000,420, which are owned by the Horizon Resources Corporation also and which is hereby incorporated by reference, discloses the significant advantages of using entrapped air as a thermal insulating barrier in the insulation of piping systems. The entrapped or "still" air technology may be accomplished in several ways that provide the multiple layers of "still" air enclosed in an opaque, clear or translucent material such as plastic. When using a clear or translucent material, the insulation system provides the added advantage of being able to evaluate the condition of the pipe or insulating system without removal of the insulation.

The first generation of the inventive insulation comprised a series of ridged multi-lumen extrusions that would be "clipped", "locked" or "snapped" together, then placed over the pipe and installed by a final "snap" to complete the installation.

BRIEF SUMMARY OF THE INVENTION

The invention incorporates a design that provides the same or similar insulation characteristics as that achieved in our previous patents. The jacket uses a core that could be extruded, thermoformed or pressed, just to name a few methods. The geometry of the inner core is constructed such that different pipe diameters can be handled with one or two designs rather than needing a separate core for each pipe size. One core design uses a relatively thin (0.010/0.020 inches) plastic "film" to form the core rather than the typical profile extrusion which is three to four times thicker, as shown in FIG. 6. The thinner core design reduces the material needed in the manufacturing process and makes the core more flexible. A plastic sheet or cover is used with the core to form the jacket. The cover also can be made thinner (0.020–0.025 inches) than the corresponding element of the previous designs. This smaller thickness allows this design to more easily meet the low smoke requirements for a fire situation in the industry. The cover and the core can be made from fire retardant polycarbonate plastic. The cover could be made of fire retatdant polycarbonate and the core could be made of polyvinlychloride.

BRIEF DESCRIPTION OF THE DRAWINGS

FIG. 1 shows a top view of the core.

FIG. 4 shows a magnification of a portion of the cross-section of the core shown in a circle in FIG. 3 and named DETAIL "A".

FIG. 4A shows a magnification of a portion of the cross-section of the core shown in a circle in FIG. 4 and named 4A.

FIG. 5A is a partial cross-sectional view of an alternate embodiment of the core installed on a pipe.

FIG. 7 is a chart showing some examples of dimensions that can be used in carrying out the invention.

DETAILED DESCRIPTION OF THE INVENTION

Figure 1A:
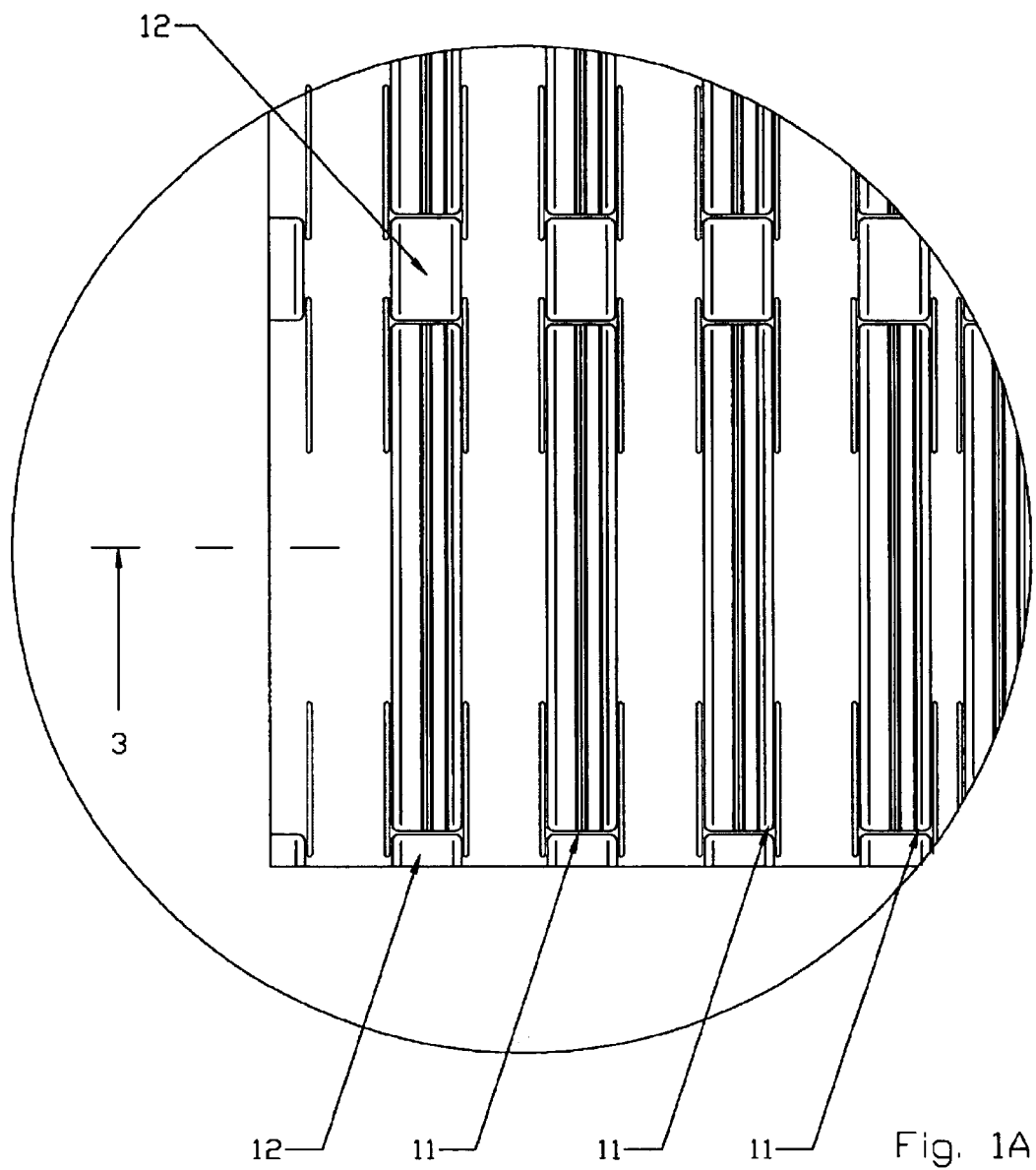
FIG. 1A shows a magnification of a portion of the cross-section of the core shown in a circle in FIG. 1 and named 1A.

FIG. 1 shows a top view of the plastic corrugated core 2. The length AB of the core relates to the chart shown in FIG. 7. The width of the core is shown as 35⅝ inches but it can be any length. When positioned on a pipe, the width of the core 2 is oriented so as to be along the length of the pipe to be insulated. As an example, the length AB of the core 2 can be manufactured in 72 inch lengths. The length AB of the core is then cut to the length shown in the AB column for the pipe size or OD shown in the chart.

FIG. 1 shows from a top view the formations created in the flat plastic sheet from which it is formed. The core is formed to create "trapped air" spaces, to strengthen the core and to minimize contact between the core, the fluid system element and the cover for the core. The core 2 has feet or protuberances 11 which contact the element and the cover to space the rest of the core from the element and the core. Rectangular portions 12 which provide areas which stiffen the core. Rectangular portions 12 are lower than the portions immediately around them and feet 11 so that they form a depressed area. Curved portions 13, 14 are spaced from the fluid system element by feet 11 which extend form the curved portions 13, 14. The curved portions add strength to the core. Flat portions 15 are spaced from the cover by feet 11 which extent from the flat portions 15. Flat portions 15 and rectangular portions 12 can be formed in the same plane.

Figure 2:
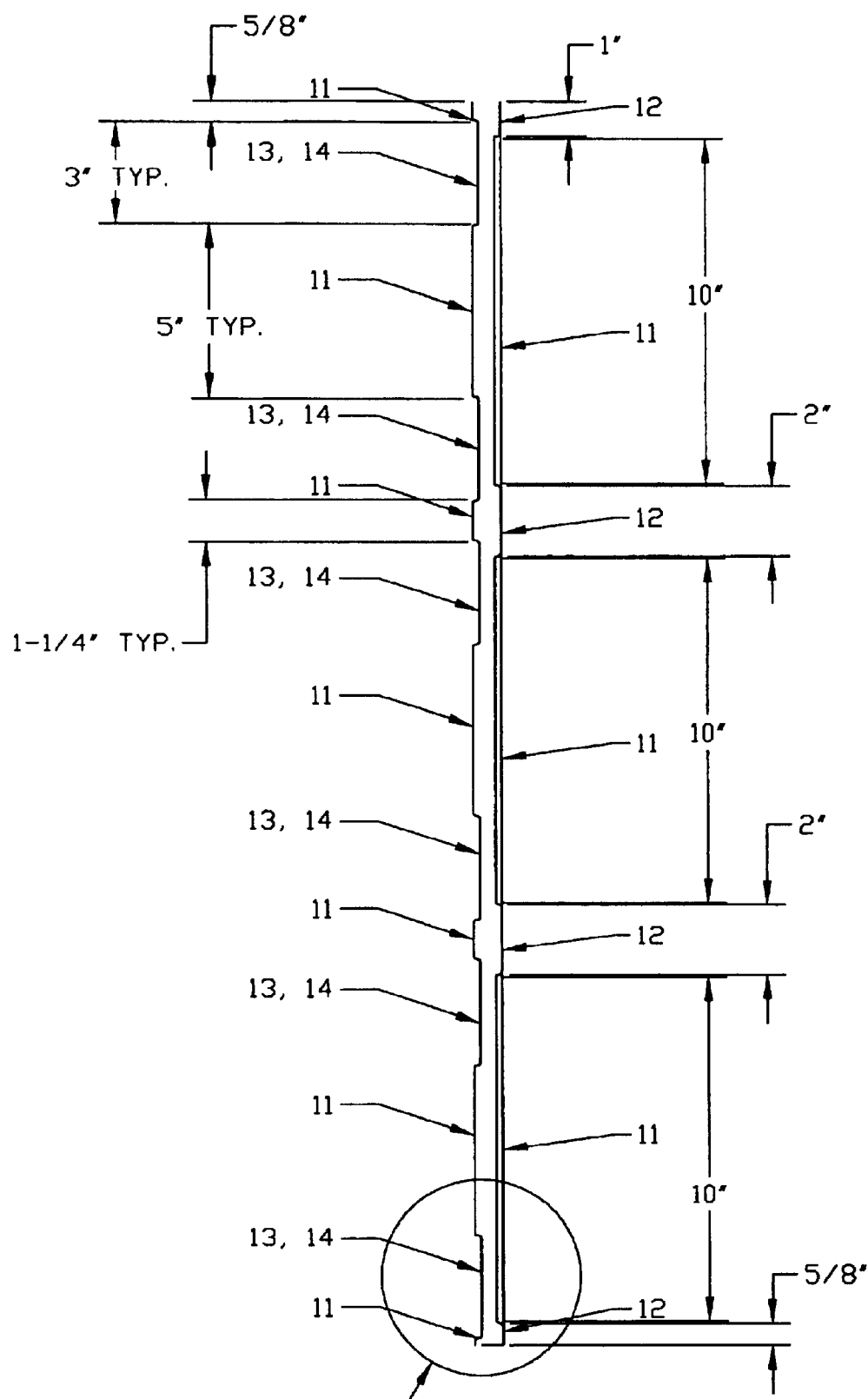
FIG. 2 shows a side view of the core.
Figure 2A:
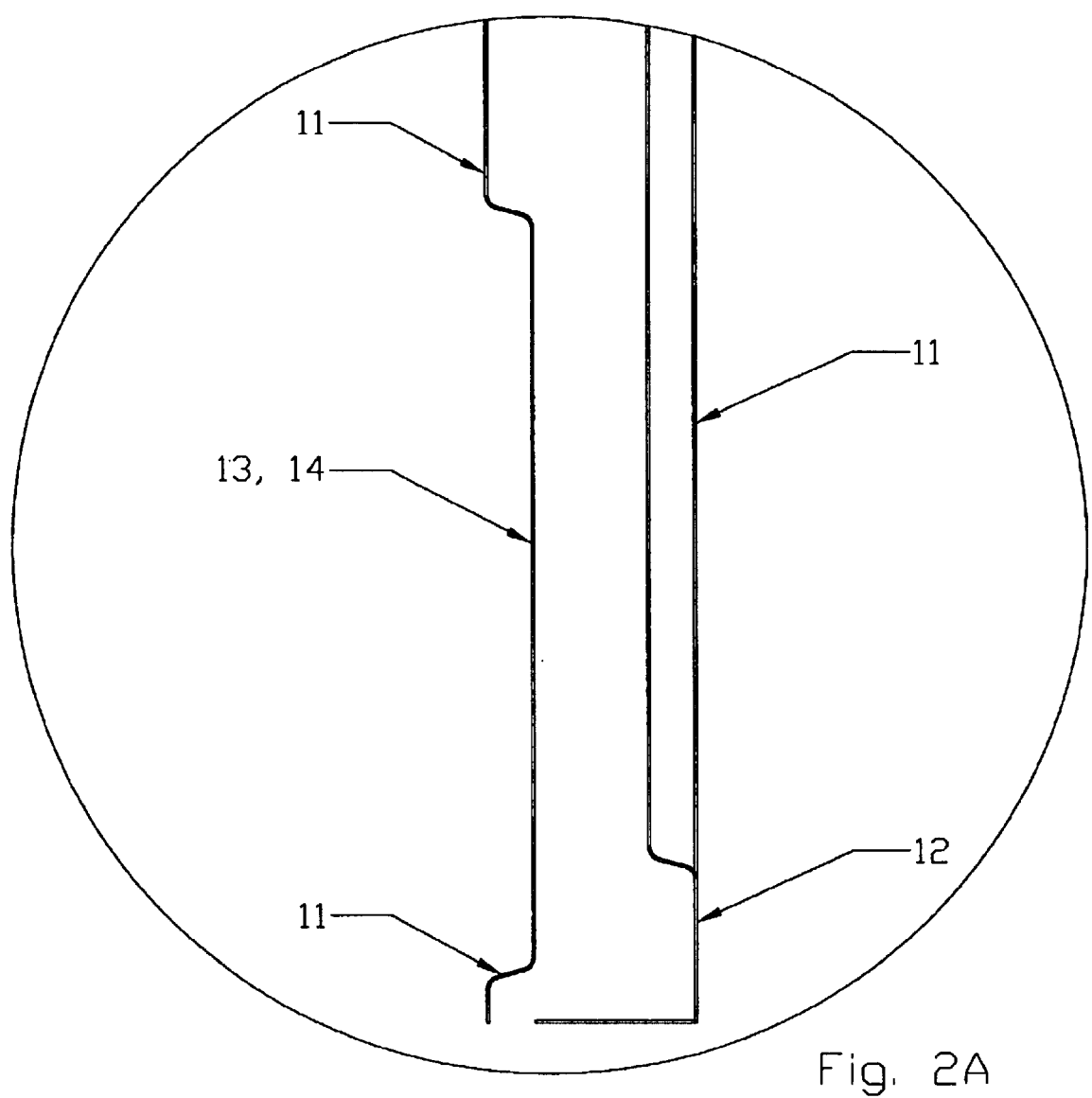
FIG. 2A shows a magnification of a portion of the cross-section of the core shown in a circle in FIG. 2 and named 2A.

FIG. 2 shows a side view of the core 2 of FIG. 1 with some typical dimensions. The legend TYP. stands for typical dimension. Portions of the core 2 are formed into different planes to create an undulating or corrugated form.

Figure 3:
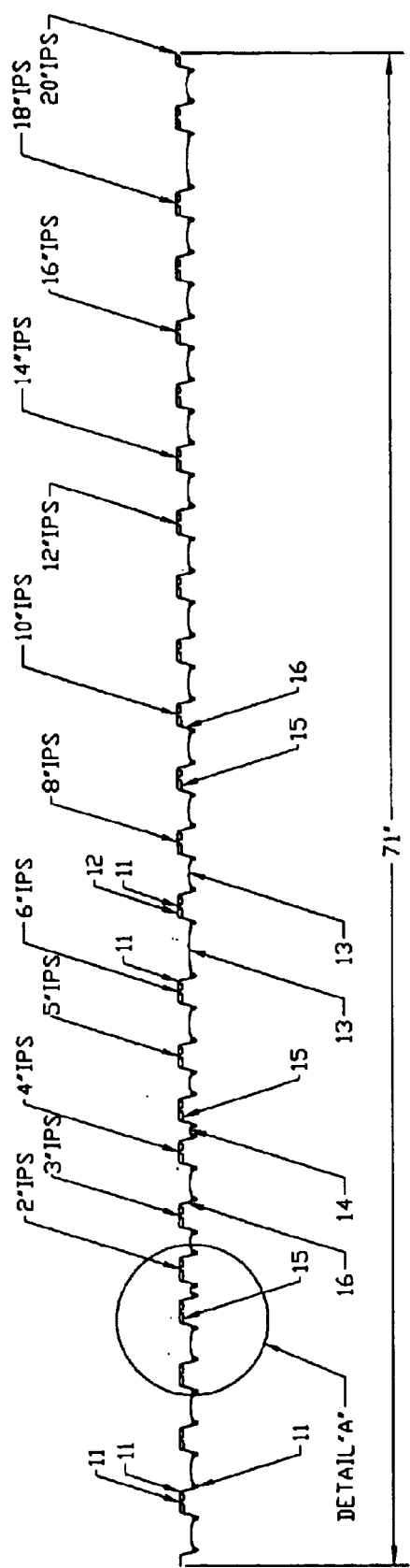
FIG. 3 shows a longitudinal cross-section of the core.

FIG. 3 shows a longitudinal cross-section of the core 2 taken along the dotted line referenced by arrows showing the direction of viewing and the number 3. The IPS legends stand for Iron Pipe Size. The legend 2" IPS shows the point at which the core length AB is cut to produce the proper wrap length for a 2 inch pipe. The same applies to 3", 4", etc. Flat portions 15 and curved portions 13,14 are joined by connecting walls 16.

FIG. 4 shows the DETAIL "A" in FIG. 3 with some typical dimensions. The air spaces are created by the volumes delineated by flat portions 15, curved portions 13, 14 and connecting walls 16. Feet or protuberances 11 extend from portions 13, 14 and 15 to minimize the contact of the core 2 with the cover and the fluid system element. The feet 11 and the space that they create allow for scale on the element and other irregularities of the element.

Figure 5:
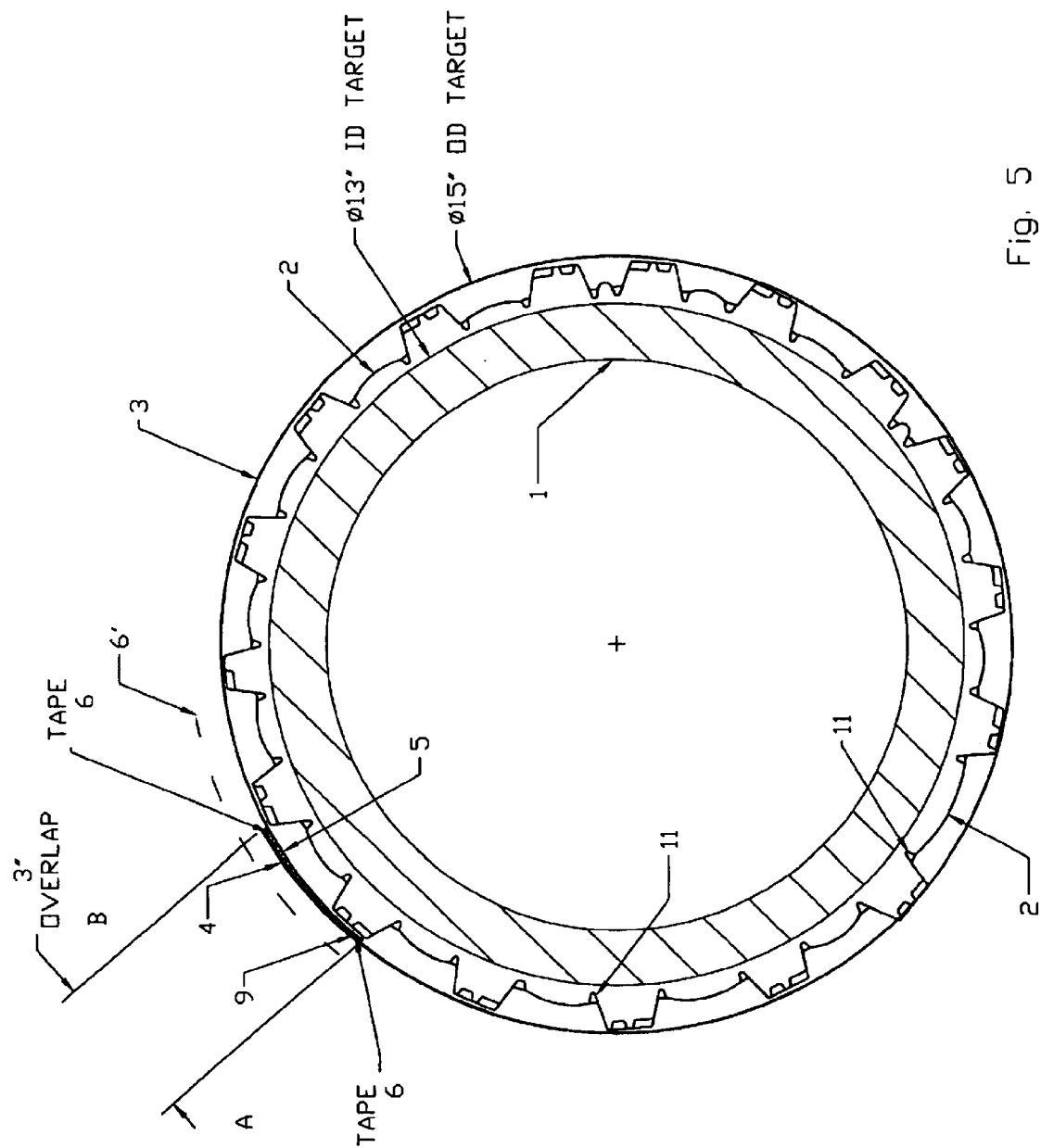
FIG. 5 is an end view of the core installed on a pipe.
Figure 5B:
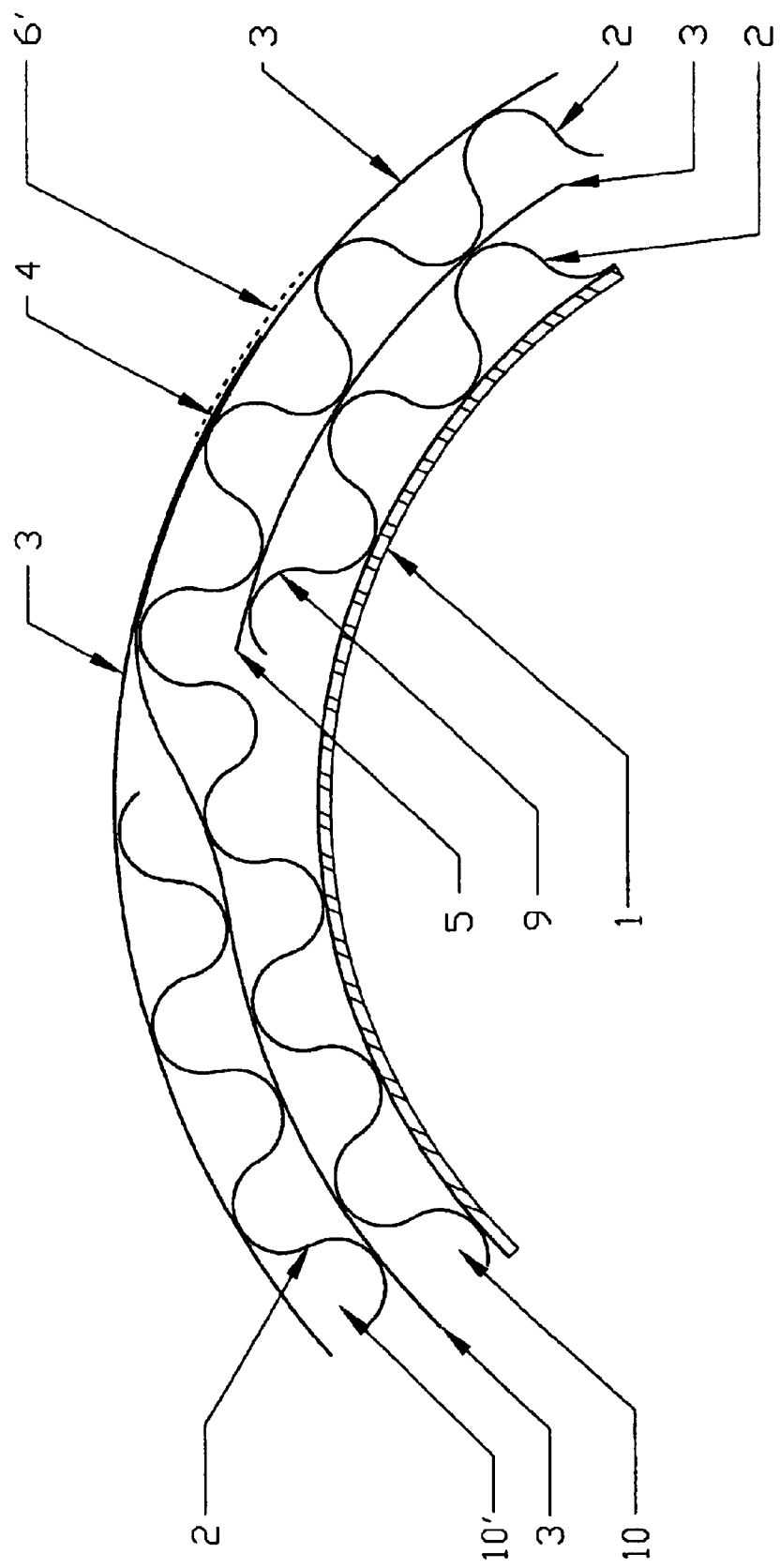
FIG. 5B is a partial cross-sectional view of the alternate embodiment of the jacket of FIG. 5A installed on a pipe using a double wrapping of the core and cover.

FIG. 5 shows an end view of the insulated jacket 10 loosely fitted on the pipe or fluid system element 1 to be insulated (shown in cross-section). In the actual installation, the core 2 would be more tightly fit around the pipe 1. That is, the feet or protuberances 11 of the core 2 will normally be touching the outer surface/diameter of the pipe 1 at many if not all of their adjacent points. FIGS. 5A and 5B show a much tighter wrapping of the jacket 10.

Figure 6:
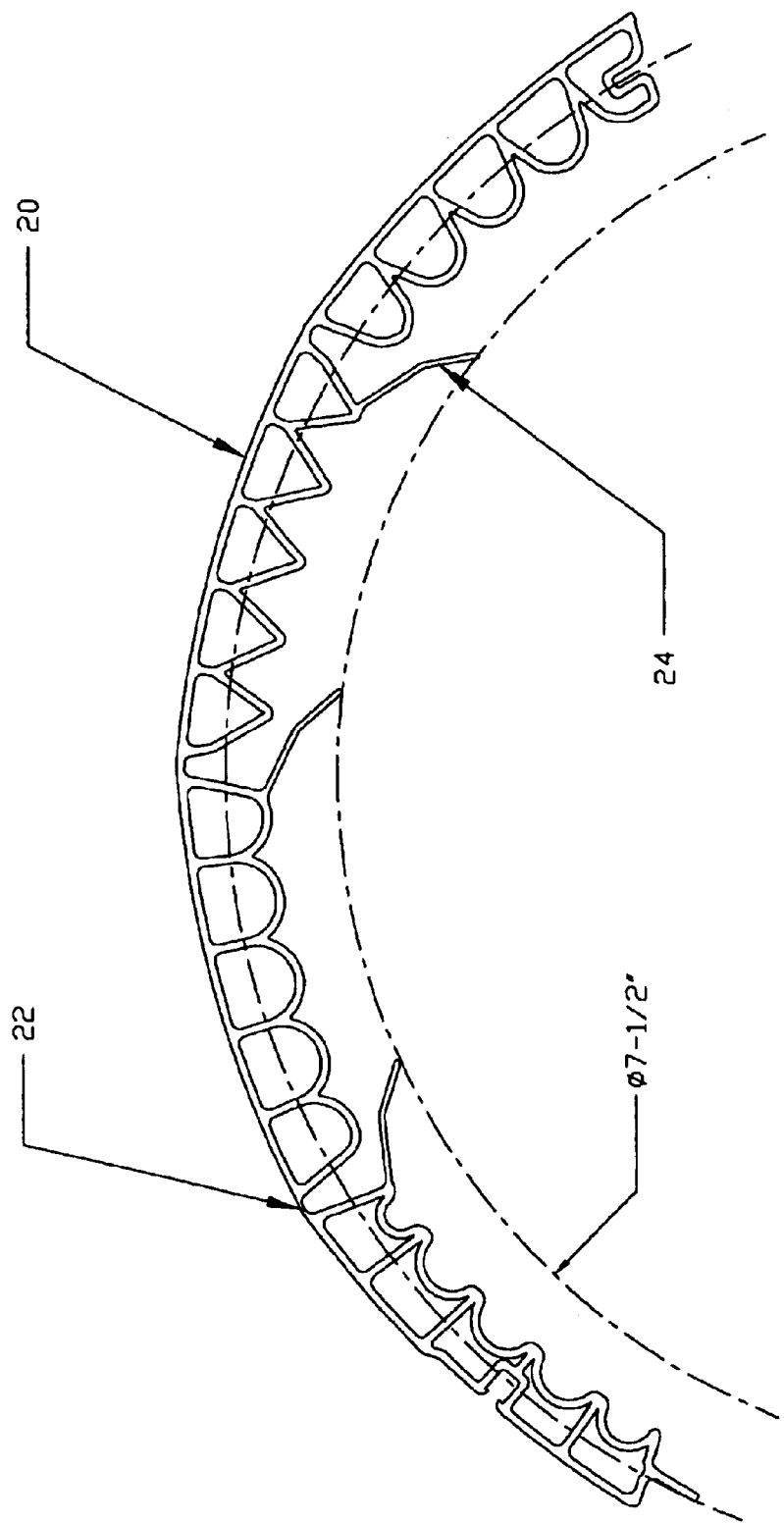
FIG. 6 is an end view of further embodiments of the core with four different shapes shown on one portion.
Figure 6A:
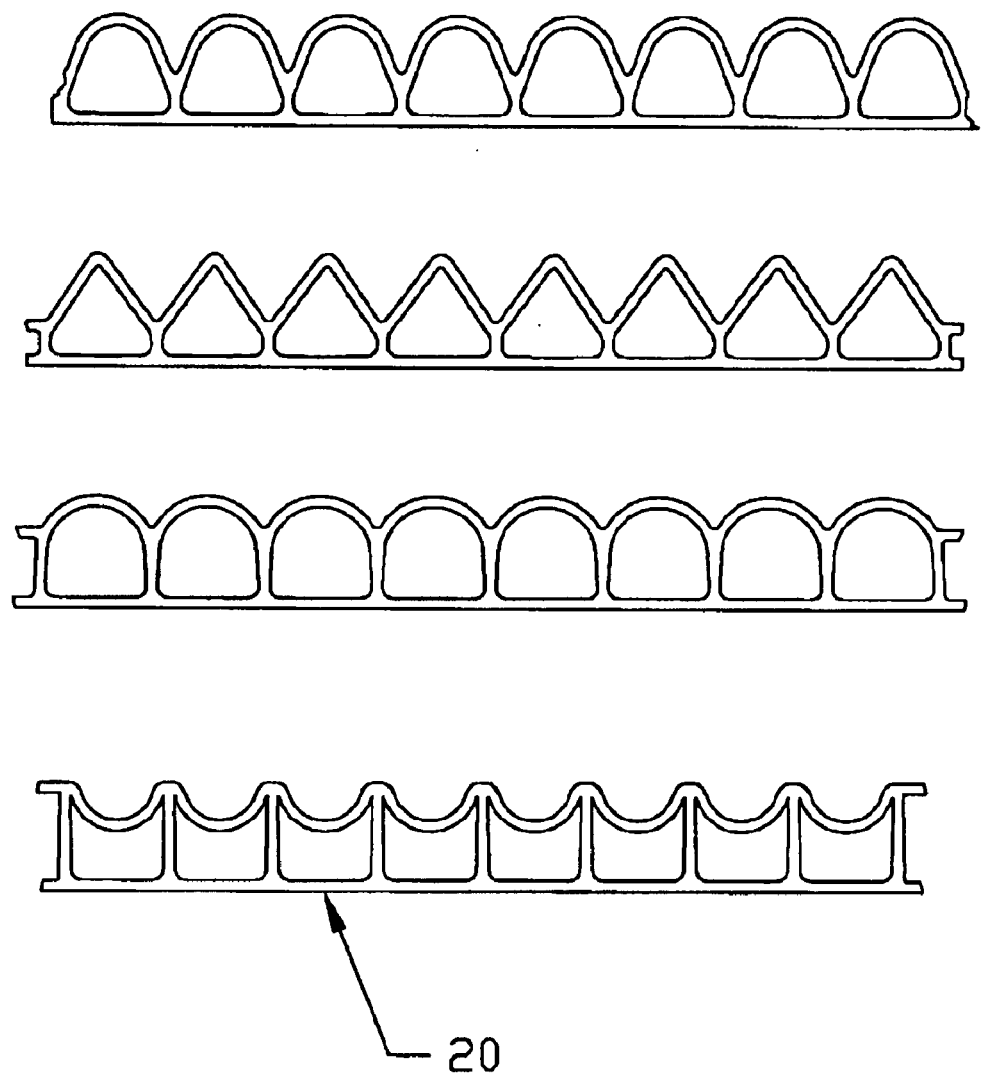
FIG. 6A is an end view of four different shapes of the core of FIG. 6 used in an alternate embodiment.

FIG. 5 shows the formed core bonded at a point 9 to one end A to a smooth, flat "exterior" sheet, shell or covering 3 which is also thinner (0.020/0.025 inches) than the typical profile extrusion shown in FIGS. 6, 6A. This design allows for the simple "wrapping" of the pipe 1 where the inner end 5 of the sheet 3 is overlapped by the outer end 4 of the sheet creating a longitudinally extending seam and attached to the sheet 3 with tape 6 or other simple bonding process. The tape 6 can be applied between the sheet ends as shown. Tape 6 is a double stick tape that is it has adhesive on both sides of the film carrier. Alternately, an adhesive can be laid on the sheet 3 with a cover film that can be removed during installation. Alternately, a one-sided tape 6', having adhesive on only one side of the film carrier, can be applied to the exterior sheet surfaces to overlapped end portion 4 and the adjacent sheet portion as shown by the dotted line and exploded in FIG. 5.

This application process is faster than the current "snap" together process. The multiple "still" or "trapped" air spaces are accomplished in much the same way in either design but with the new design the wrap around the pipe could be two revolutions rather than one. The two revolutions could be accomplished by adding a separate core 2 and a separate sheet 3 to form a second jacket 10' on an already installed core and sheet jacket 10 as shown in FIG. 5A. Alternatively, a second wrap and jacket 10' could be accomplished merely by applying a longer core 2 and sheet or covering 3 and wrapping twice and sealing the outer end 4 once by the use of a fastener such as tape 6' shown in dotted lines and exploded in FIG. 5B. The tape 6' can be applied to the exterior sheet surfaces to overlapped end portion 4 and the adjacent sheet portion as shown. This double jacket will provide a greater level of insulation in those areas where extra insulation is required. Of course, more jackets 10,10' can be provided than the two disclosed to build more insulation by the use of either design, FIG. 5A or 5B, or a combination of the designs. That is, three or more jackets can be built by wrapping more times or making three or more separate jackets or a combination of multiple wraps and separate jackets.

In FIG. 6, an alternate core design is shown in which the "still" air space is designed so that it will automatically compensate for different pipe sizes by having an integral core and sheet element or jacket 20 with flexible hinges 22 and flexible standoffs 24 which flex as necessary to allow for "wrapping" different size piping. In this design, the core is bonded to the smooth outer shell/sheet at every contact point thereby forming the jacket 20. This figure shows different core configurations in the same figure; however only one configuration need be used. FIG. 6A shows that the jacket 20 can be reversed with the smooth shell/sheet facing inwards. The figure also shows separately some of the core configurations that could be used. Hinges 22 and stand-offs 24 would be added where needed.

The chart of FIG. 7 gives examples of dimensions of the jacket of FIGS. 1–5 for various pipe sizes. The section of the chart under the Insulair TM section refers to the jacket dimensions. AB refers to the length of the core. The length of the sheet or cover 3 is AB plus three inches, for example to allow the sheet to overlap the core. Actual OD is the jacket OD.

The concepts shown in FIGS. 1–5 have the core bonded to the outer sheet/cover ONLY at a first contact point 9; all other contact points are not bonded thereby allowing the inner core and outer sheet to slide with respect to each other and thereby compensate for any pipe diameter or even unusual shape such as a water tank or jacketed tank.

The core geometry as shown in FIG. 4 is only one of many patterns that would be acceptable to accomplish all the desired attributes of the system. As only one example of the many core shapes that are acceptable, FIGS. 5A and 5B show the use of a simple undulating core having the corrugations extending longitudinally along the element or pipe 1. The corrugations can extend at an angle to the length of the element. The corrugations can even be perpendicular to the length of the element by providing areas which allow portions of the corrugations to flex or to move relative to each other.

It has been proven that there does not need to be a continuous seal between individual chambers within the core, reduced clearances between core chambers are sufficient to greatly reduce airflow between them and therefore still provide ample insulation. Additionally the size of the "entrapped" air gap or "still" air gap although optimum at approximately $3/8"$ is only minimally affected by being formed larger or smaller.

A "donut" gasket having a cut portion is installed, as disclosed in U.S. Pat. No. 6,000,420, between the jacket ends. The core can be made shorter than the cover by the dimension of the gasket or less so that the gasket will be fully or partially within the cover during installation. For example, the core would be $35 5/8$ inches and the cover would be 36 inches. The adjacent jackets are sealed to each other by tape which is applied around the ends of the adjacent jackets and over the gasket if it is not full contained within the jacket cover. The gasket can be wholly outside the jackets.

In another embodiment of the invention, the insulative jacket is used to cover, contain or further insulate an existing insulation system. This embodiment would allow the inventive insulation system to be used on existing systems that may need containment of the materials of the insulation (fibers, etc.), resealing or replacement either now or in the future. The advantage of this design is that it would allow the fibers in the existing insulation to be contained in a very cost effective manner. The cost of removing the fibers of a fiberglass installation would be eliminated. Also, extra insulation would be added to the present/existing insulation. Further, the condition of the system would be visible through any transparent or translucent plastic making up the system or parts thereof. Further each portion of the insulation system can be easily accessed by removing the fastening means, such as tape, at the longitudinal joint formed by the overlap of the sheet outer end 4 and the adjacent sheet portion.

When using tape 6 as the fastening means, a further seal is not needed at the joint/overlap because the tape can perform both functions. If another non-sealing type of fastener is used at the overlap of end 4, then a separate seal could be added to overlap area such as by adding an elastomeric material to end 4 on the inside surface. If the tape is provided only to hold an area together which is less than the total area to be sealed then a seal would be needed at least on the non-taped portions of the joint. U.S. Pat. Nos. 5,797,415 and 6,000,240 discuss some of the possible seals.

I claim:

1. A method of heat insulating an element of a hot or cold fluid distribution system comprising the following steps, providing an insulation system formed by a thin plastic jacket material around the element, the jacket forming air spaces around the element the jacket creating the air spaces by providing around the element a core having at least some portions extending away from the element and a sheet which is attached to the core at one point only and which covers the core, choosing the jacket material thickness such that the insulation value of the jacket material is insignificant relative to the overall insulation value of the insulation system, the air spaces forming substantially all of the insulation value of the insulation system, omitting other kinds of solid insulation from the air spaces, joining the sheet to itself along a longitudinally extending seam, and sealing the longitudinally extending seam.

2. The method of claim 1 wherein, the joining step is performed by taping the longitudinally extending seam of the cover.

3. The method of claim 1 wherein, the core is formed by a planar plastic member having portions which extend out of the plane in at least one direction.

4. The method of claim 3 wherein,

The core is formed having portions which extend outwardly in opposing directions.

5. The method of claim 1 wherein, the core is formed by a plastic member having corrugations extending longitudinally of the element.

* * * * *